(12) United States Patent
Nomoto et al.

(10) Patent No.: US 12,471,499 B2
(45) Date of Patent: Nov. 11, 2025

(54) MAGNETIC DEVICE AND MAGNETIC STORAGE DEVICE

(71) Applicant: Kioxia Corporation, Tokyo (JP)

(72) Inventors: Rina Nomoto, Tokyo (JP); Hiroyuki Kanaya, Yokohama Kanagawa (JP); Yusuke Muto, Yokkaichi Mie (JP); Takeshi Iwasaki, Kuwana Mie (JP)

(73) Assignee: Kioxia Corporation, Tokyo (JP)

( * ) Notice: Subject to any disclaimer, the term of this patent is extended or adjusted under 35 U.S.C. 154(b) by 175 days.

(21) Appl. No.: 18/456,397

(22) Filed: Aug. 25, 2023

(65) Prior Publication Data

US 2024/0074324 A1    Feb. 29, 2024

(30) Foreign Application Priority Data

Aug. 26, 2022   (JP) ................. 2022-134896

(51) Int. Cl.
| | |
|---|---|
| *H10N 50/00* | (2023.01) |
| *G11C 11/16* | (2006.01) |
| *H10B 61/00* | (2023.01) |
| *H10N 50/10* | (2023.01) |
| *H10N 50/85* | (2023.01) |

(52) U.S. Cl.
CPC ............ *H10N 50/10* (2023.02); *G11C 11/161* (2013.01); *H10B 61/00* (2023.02); *H10N 50/85* (2023.02); *G11C 11/1673* (2013.01); *G11C 11/1675* (2013.01)

(58) Field of Classification Search
CPC .............. G11C 11/161; G11C 11/1659; G11C 11/1673; G11C 11/1675; G11C 2211/5615; H10B 61/00; H10B 61/10; H10B 61/22; H10B 61/20; H10B 12/0387; H10N 50/10; H10N 50/01; H10N 50/80; H10N 50/85; H10N 50/20; H01L 21/6838; H01L 22/12; H01L 22/14
See application file for complete search history.

(56) References Cited

U.S. PATENT DOCUMENTS

| | | |
|---|---|---|
| 9,847,474 B2 | 12/2017 | Kim |
| 10,600,956 B2 | 3/2020 | Ha |
| 10,943,950 B2 * | 3/2021 | Ouellette ............... H10N 50/10 |
| | (Continued) | |

FOREIGN PATENT DOCUMENTS

| | | |
|---|---|---|
| WO | 2015141313 A1 | 9/2015 |
| WO | 2020022375 A1 | 8/2021 |

OTHER PUBLICATIONS

S.G. Kim et al., "Breakthrough of Selector Technology for crosspoint 25-nm ReRAM", 2017 IEEE International Electron Devices Meeting (IEDM), Dec. 2-6, 2017, DOI: 10.1109/IEDM.2017.8268309.

*Primary Examiner* — Thong Q Le
(74) *Attorney, Agent, or Firm* — Kim & Stewart LLP

(57) ABSTRACT

According to one embodiment, a magnetic device includes a layered body with a first magnetic layer, a second magnetic layer, and a first non-magnetic layer between the first magnetic body and the second magnetic body. A side wall layer covers at least a side wall of the first non-magnetic body of the layered body and includes at least one first substance chosen from silicon oxide, zirconium oxide, aluminum oxide, aluminum nitride, and silicon nitride, and at least one second substance chosen from arsenic, tellurium, antimony, bismuth, and germanium.

20 Claims, 10 Drawing Sheets

(56) References Cited

U.S. PATENT DOCUMENTS

| | | |
|---|---|---|
| 11,114,612 B2 | 9/2021 | Lin |
| 2016/0365509 A1 | 12/2016 | Saida |
| 2021/0273002 A1 | 9/2021 | Shimizu |

* cited by examiner

# MAGNETIC DEVICE AND MAGNETIC STORAGE DEVICE

CROSS-REFERENCE TO RELATED APPLICATION(S)

This application is based upon and claims the benefit of priority from Japanese Patent Application No. 2022-134896, filed Aug. 26, 2022, the entire contents of which are incorporated herein by reference.

FIELD

Embodiments described herein relate generally to a magnetic device and a magnetic storage device.

BACKGROUND

A magnetic random-access memory (MRAM), which is non-volatile memory type, is attracting attention. In a MRAM, operations such as an information write operation and a read operation are carried out by using a magnetic tunnel junction (MTJ) element. An MTJ element generally has a structure with three stacked layers. The three stacked layers are a magnetic layer (as a storage layer), a tunnel barrier layer, and another magnetic layer (as a reference layer). An MTJ element is such that, with a spin orientation of the reference layer in a fixed state, an information write is carried out by causing a spin of the storage layer (a free layer) to invert, and an information read is carried out by utilizing a tunnel magnetoresistance ratio. An MRAM including this kind of MTJ element and a switching element may have issues with degradation of the tunnel barrier layer, and an erroneous write, or the like may occur due to a current flowing in the MTJ element.

BRIEF DESCRIPTION OF THE DRAWINGS

FIG. 3 is a drawing showing a flow of current when a comparative example MRAM is turned on.

FIG. 4 is a drawing showing a current flowing into a magnetic device when a comparative example MRAM is turned on.

FIG. 5 is a drawing showing a flow of current when an MRAM of an embodiment is turned on.

FIG. 7 is a drawing showing a current flowing into a magnetic device when an MRAM of an embodiment is turned on.

DETAILED DESCRIPTION

Embodiments provide a magnetic device and a magnetic storage device such that an occurrence of degradation of a tunnel barrier layer, an erroneous write, and the like can be limited.

In general, according to one embodiment, a magnetic device includes a layered body with a first magnetic layer, a second magnetic layer, and a first non-magnetic layer between the first magnetic layer and the second magnetic layer. A side wall layer covers a side wall of at least the first non-magnetic layer. The side wall layer comprises at least one first substance selected from a group consisting of silicon oxide, zirconium oxide, aluminum oxide, aluminum nitride, and silicon nitride. The side wall layer also comprises at least one second substance selected from a group consisting of arsenic, tellurium, antimony, bismuth, and germanium.

Hereafter, a magnetic device and a magnetic storage device of certain example embodiments will be described with reference to the drawings. In these example embodiments, identical reference symbols are allotted to substantially identical components, and a description thereof may partially be omitted. The drawings are schematic, and any depicted relationship between a thickness and a planar dimension, a ratio of thicknesses, and the like of the components or aspects may differ from actuality.

Figure 1:
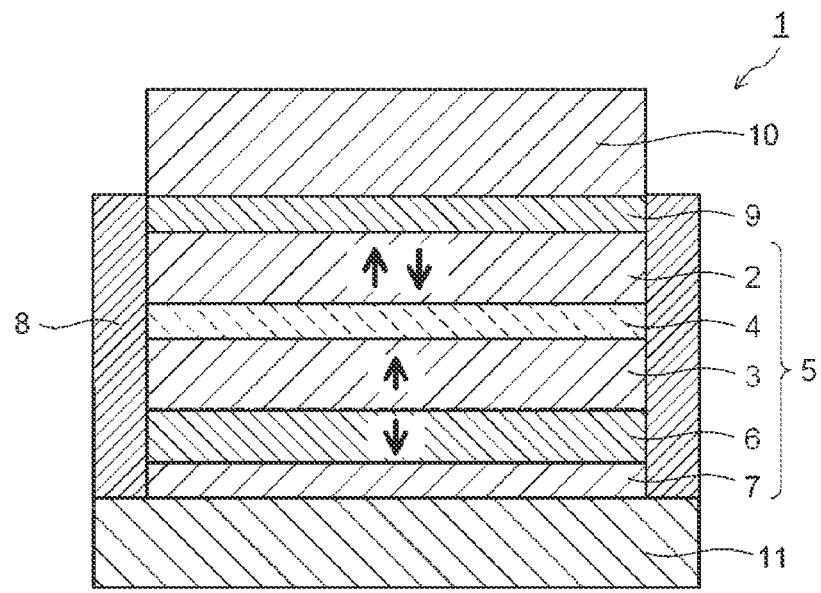
FIG. 1 is a cross-sectional view showing a magnetic device of an embodiment.

FIG. 1 shows a configuration of a magnetic device of an embodiment. A magnetic device 1 shown in FIG. 1 includes a layered body 5 including a first magnetic body 2 as a storage layer (also referred to as a storage layer 2), a second magnetic body 3 as a reference layer (also referred to as a reference layer 3), and a first non-magnetic body 4 as a tunnel barrier layer (also referred to as a tunnel barrier layer 4). The first non-magnetic body 4 is sandwiched between the first magnetic body 2 and the second magnetic body 3. The layered body 5 also includes a third magnetic body 6 as a shift canceling layer (also referred to as a shift canceling layer 6) below the second magnetic body 3 and a buffer layer 7 that functions as a seed layer, or the like, provided below the third magnetic body 6. The layered body 5 shown in FIG. 1 forms a magnetic tunnel junction (MTJ) element, but examples are not limited to this.

The magnetic device 1 further includes a side wall layer 8 that covers a side wall of the layered body 5. The side wall layer 8 can be a composite material of at least one first substance chosen from a group including silicon oxide ($SiO_x$), zirconium oxide ($ZrO_x$), aluminum oxide ($AlO_x$), aluminum nitride ($AlN_x$), and silicon nitride ($SiN_x$) and at least one second substance chosen from a group including arsenic (As), tellurium (Te), antimony (Sb), bismuth (Bi), and germanium (Ge). A compound acting as a first substance is such that a value of X in $SiO_x$, $ZrO_x$, and the like can be a freely selected number, and it is generally sufficient that the number be such that the first substance functions as an insulator. In FIG. 1, the side wall layer 8 covers the whole side wall of the layered body 5, but, in other examples, it is sufficient that the side wall layer 8 formed with the composite material covers at least the side wall of the first non-magnetic body 4 (acting as a tunnel barrier layer) of the layered body 5.

When the magnetic device 1 of an embodiment is to be used as an MTJ element, the second magnetic body 3 is a reference layer (a magnetization fixed layer/a pin layer) whose spin orientation (magnetization direction) is fixed. The magnetization direction of the second magnetic body 3 is fixed by the third magnetic body 6 that acts as a shift canceling layer. A layered film of CoFeB/Mo/Co/Ir, a layered film of CoFeB/Mo/Co/Ru, or the like, can be used as the second magnetic body 3. A magnetic body such as a [Co/Pt] superlattice or a [Co/Ir] superlattice may be used as the third magnetic body 6. The layered film configuring the reference layer 3 is such that an Ir layer or a Ru layer realizes an antiparallel coupling between the Ir layer or the Ru layer and the shift canceling layer 6. Because of this, the magnetization of a magnetic layer formed of CoFeB or the like in the reference layer 3 is fixed.

The first magnetic body 2, which functions as a storage layer (free layer), is provided on the second magnetic body 3 (acting as a reference layer) across the first non-magnetic body 4 (functioning as a tunnel barrier layer). The first magnetic body 2 functions as a storage layer (data storage layer) by the spin direction (magnetization direction) changing in accordance with the intended storage contents (data value). A magnetic body of a Co-based alloy such as CoFeB, CoPt, or CoPtCr, a [Co/Pt] superlattice, or the like, can be used as the first magnetic body 2. Thicknesses of the first magnetic body 2 and the second magnetic body 3 (the CoFeB layer in the layered film) are not particularly limited, but are preferably, for example, 0.2 nm or greater, 5 nm or less. An insulator such as MgO, MgAlO, MgGaO, MgZnO, ScN, or AlN can be used as the first non-magnetic body 4. A thickness of the first non-magnetic body 4 is preferably, for example, 0.5 nm or greater, 5 nm or less. A seed layer of Ru, Ta, CoFeB—Mo, or the like, can be applied as the buffer layer 7 provided below the third magnetic body 6.

A capping layer 9 including Ta, Pt, Ru, or the like is provided on the layered body 5. A wiring layer 10 is provided on the capping layer 9. Metals such as W, Mo, Ta, or an alloy including any of these metals, or the like can be used as the wiring layer 10, but the selection of the materials for wiring layer 10 is not particularly limiting.

A switching layer 11 electrically connected to the MTJ element 5 is provided below the layered body 5. The switching layer 11 has a function of switching a current supplied to the MTJ element 5 on and off (a switching function). The switching layer 11 has electrical properties of rapidly transitioning from an off state (electrical resistance value is high) to an on state (electrical resistance value is low) when a voltage equal to or greater than a threshold (Vth) is applied. The material (a switching material) configuring the switching layer 11 has properties of being high resistance when an applied voltage is lower than a threshold (Vth) value, but rapidly transitioning (switching) from the off state (high resistance state) to an on state (low resistance state) once the voltage reaches the threshold (Vth) value or higher. This kind of change in the resistance value of the switching layer 11 based on the applied voltage occurs reversibly (back-and-forth) and rapidly.

A material including at least one chalcogen element chosen from a group including tellurium (Te), selenium (Se), and sulfur (S) can be used as a switching material. Such a switching material may also include a chalcogenide, which is a compound that includes a chalcogen element. A material including a chalcogen element may also include at least one element chosen from a group of Al, Ga, In, Si, Ge, Sn, As, P, Sb, and Bi. Furthermore, the material including a chalcogen element may also include at least one element chosen from a group of nitrogen (N), oxygen (O), carbon (C), and boron (B). For example, GeSbTe, GeTe, SbTe, SiTe, AlTeN, GeAsSe, and the like are suggested as examples of a switching material. A switching material is not limited to a material including a chalcogen element, may not include a chalcogen element. A switching material may incorporate an additive element such as antimony (Sb), germanium (Ge), arsenic (As), or bismuth (Bi). For example, such additive elements may be added to an oxide or a nitride material. Oxide materials such as $ZrO_x$, $AlO_x$, $SiO_x$, $TaO_x$, $HfO_x$, and the like can be this kind of switching material with an additive element. For example, the aforementioned additive elements or tellurium (Te) or selenium (Se) can be added to these oxides. The switching layer 11 may have an amorphous structure.

Figure 2:
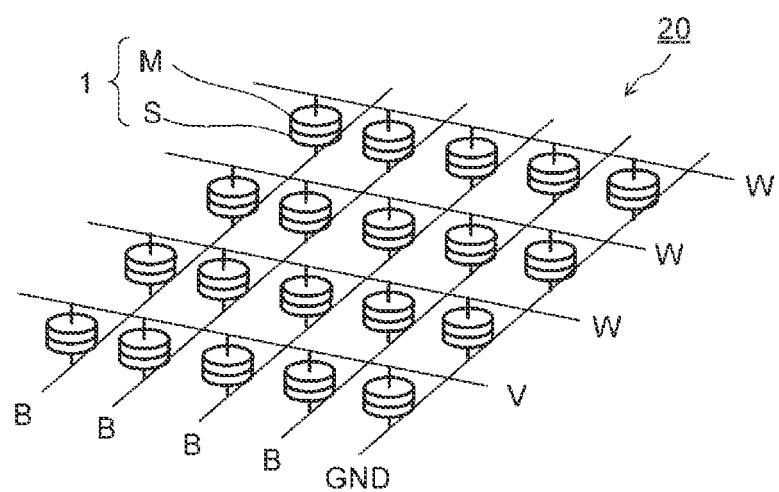
FIG. 2 is a drawing showing a magnetic storage device (an MRAM) with a cross point structure in which a magnetic device of an embodiment is used.

A magnetic device 1 configuring an MRAM or the like can be disposed at intersections of bit lines BL and word lines WL, as shown in FIG. 2, and functions as a memory cell. As shown in FIG. 2, a magnetic storage device 20 has a magnetic device 1 electrically connected to a bit line BL and a word line WL at each intersection of bit lines BL and word lines WL. The magnetic storage device 20 shown in FIG. 2 includes bit lines BL (first electrode wires), word lines WL (second electrode wires), and a plurality of magnetic devices 1. Reference symbol "M" in FIG. 2 indicates a MTJ M corresponding to the layered body 5, (see FIG. 1) and a reference symbol "S" in FIG. 2 indicates a switching layer 11 (also referred to as switch S in this context) (see FIG. 1).

Figure 3:
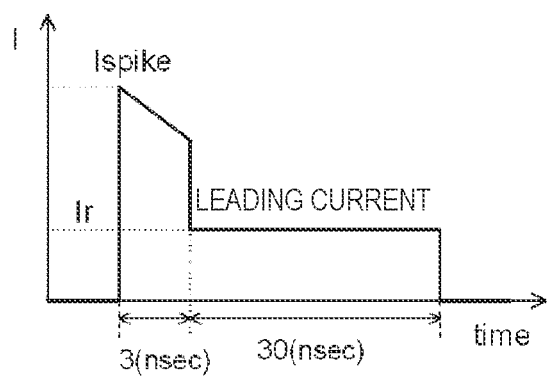
Figure 4:
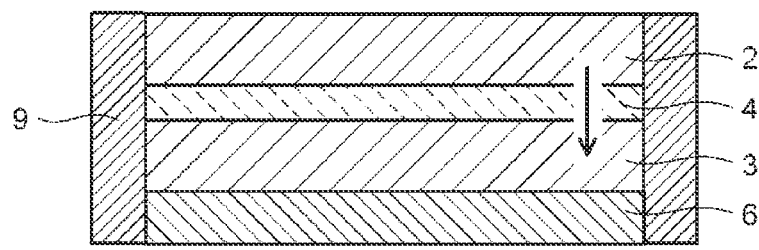

In a comparative example structure in which the side wall layer 8 is only an insulator such as silicon nitride ($SiN_x$) is used in the magnetic storage device 20 is such that a high current flows in MTJ element M and the switch S. That is, as shown in FIG. 3, a short-pulse high current $I_{spike}$ (a spike current) flows at the instant at which the switch S is turned on (placed in the on state). This kind of high current is only short-pulsed (temporary), and subsequently a constant "leading current" flows. As shown in FIG. 4, however, even with a short pulse high current, a high current flows into the first non-magnetic body 4 (acting as a tunnel barrier layer) so there is concern that degradation of the tunnel barrier layer, an erroneous write, or the like will occur.

In the present embodiment, a side wall layer 8 formed of a composite material including a first substance and a second substance is used in the magnetic device 1. By at least one first substance chosen from a group of $SiO_x$, $ZrO_x$, $AlO_x$, $AlN_x$, and $SiN_x$ being doped with at least one second substance chosen from a group of As, Te, Sb, Bi, and Ge, a Poole-Frenkel conduction is observed. A Poole-Frenkel conduction is a phenomenon wherein trapped electrons jump out of level when an electrical field is applied to an insulating film, even when there is not extremely high thermal energy.

Figure 5:
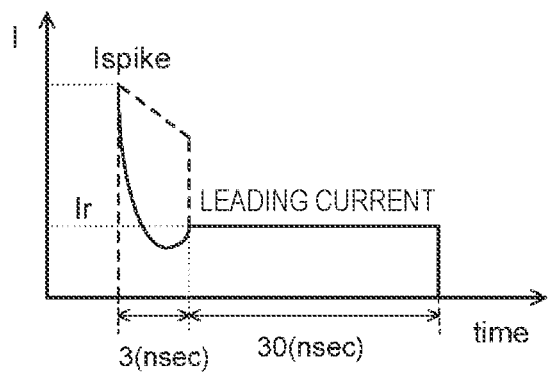

The side wall layer 8 formed of a composite material of an embodiment displays this kind of Poole-Frenkel conduction. With such a composite material, the resistance value decreases only under conditions of a high temperature and a high electrical field. This means that when a short-pulse high current (a spike current) flows at the instant at which the switch S is turned on, the resistance value of the side wall layer 8 decreases only in a period in which the spike current flows. Because of this, as shown in FIG. 5, the resistance value of the side wall layer 8 decreases when a spike current is generated, and current also flows into the side wall layer 8 immediately after the spike. Because of this, current flowing into the first non-magnetic body 4 can be decreased, meaning that degradation of the first non-magnetic body 4 and an erroneous write caused by a spike current can be reduced.

Figure 6:
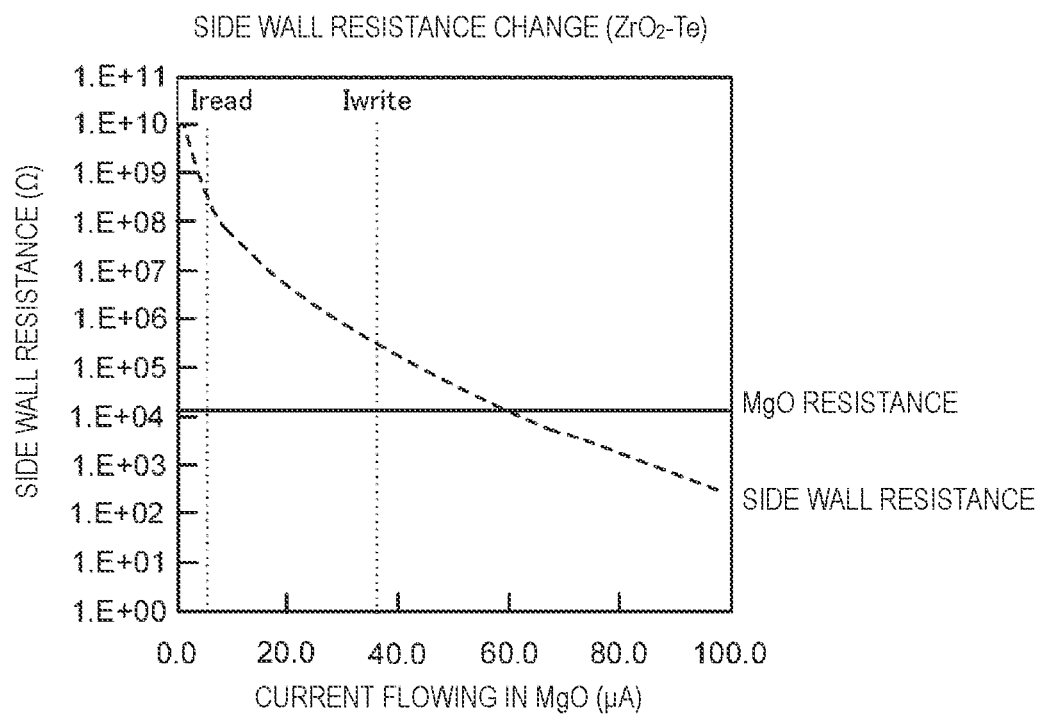
FIG. 6 is a drawing showing a change in side wall resistance when a composite material of $ZrO_2$ and Te is applied to a side wall layer of a magnetic device of an embodiment.

A change in side wall resistance when Te is added to $ZrO_2$ ($ZrO_2$+Te) and this material is used for the side wall layer 8 is shown in FIG. 6. This $ZrO_2$+Te material is one example of a composite material including the first substance and second substance. For FIG. 6, it is assumed that an electrical field that is a spike current×$R_{MgO}/d_{MgO}$ acts on a side wall, and a result of calculating the side wall resistance during the spike is shown. It is also assumed for this calculation that the temperature is 300K. When a spike current of approximately 60 μA is generated, the resistances of the tunnel barrier layer 4 (formed of MgO) and the side wall layer 8 (formed of $ZrO_2$+Te) are of about the same degree, as shown in FIG. 6. This means that when a spike current of 60 μA is generated, at least some portion of the spike current can be caused to flow into the side wall layer 8. Because of this, current flowing into the first non-magnetic body 4 can be caused to decrease. The same is true when a combination other than that of a $ZrO_2$ material doped with Te is used as a combination of a first substance and a second substance.

Figure 7:
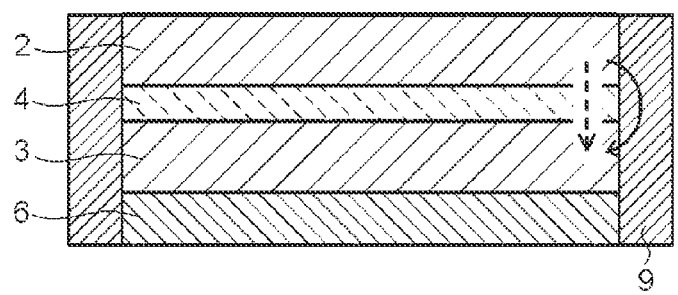
Figure 8:
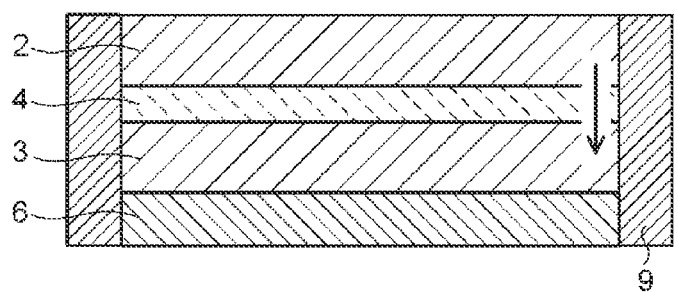
FIG. 8 is a drawing showing a current flowing into a magnetic device at a time of a read and a time of a write of an MRAM of an embodiment.

The portion of current flowing into the side wall layer 8 is depicted in FIG. 7. This additional current flow path occurs when a current like a spike current is generated. As shown in FIG. 8, a current in a normal state flows between the storage layer 2 and the reference layer 3 via the tunnel barrier layer 4. Consequently, as current flows between the storage layer 2 and the reference layer 3 via the tunnel barrier layer 4 without any substantial portion flowing in the side wall layer 8, as shown in FIG. 8. Thus, in a reading or writing operation, there is no impediment to a read operation or a write operation caused by the presence of the side wall layer 8. By causing at least one portion of a spike current to flow into the side wall layer 8, as shown in FIG. 7, degradation of the tunnel barrier layer 4 by a spike current can be avoided as can an erroneous write.

A composite material including the first substance and second substance in an embodiment is preferably such that a content of the second substance is between 2 atomic percent (atm %) to 46 atomic percent (atm %) in the composite material. When the second substance is less than 2 atomic percent, there is concern that the Poole-Frenkel conduction cannot be well realized. In an example, the second substance is more preferably 11 atomic percent or greater. When the second substance exceeds 46 atomic percent (46 atm %), there is concern that the properties of the first substance as an insulator will deteriorate, and the original insulative properties as the side wall layer 8 cannot be realized. The second substance in an example is more preferably 20 atomic percent or less.

Furthermore, with regard to a composite material as a component of the side wall layer 8, at least one first substance chosen from a group of $SiO_x$, $ZrO_x$, $AlO_x$, $AlN_x$, and $SiN_x$ and at least one second substance chosen from a group of As, Te, Sb, Bi, and Ge can be used. Furthermore, as certain specific example combinations for the composite material: $ZrO_x$ and Te, $SiO_x$ and Te, $AlN_x$ and Te, $AlO_x$ and Te, $ZrO_x$ and Sb, $SiO_x$ and Sb, $SiO_x$ and As, and $SiO_x$ and Bi can be applied to cause the Poole-Frenkel conduction to be realized with good reproducibility.

Figure 9:
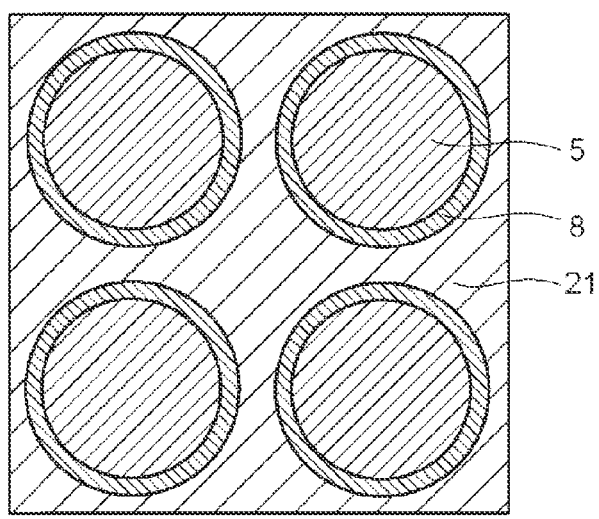
FIG. 9 is a drawing showing a first example of a planar form of a magnetic device of an embodiment.
Figure 10:
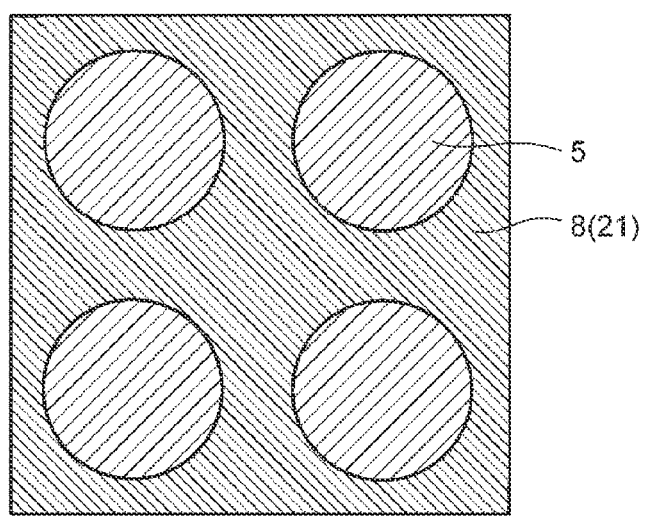
FIG. 10 is a drawing showing a second example of a planar form of a magnetic device of an embodiment.
Figure 11:
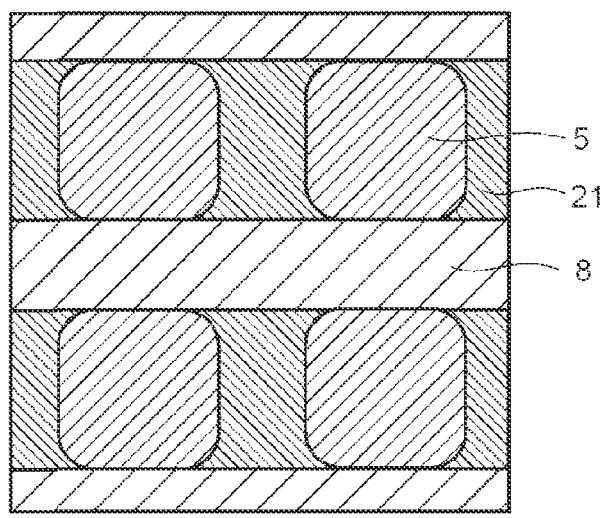
FIG. 11 is a drawing showing a third example of a planar form of a magnetic device of an embodiment.
Figure 12:
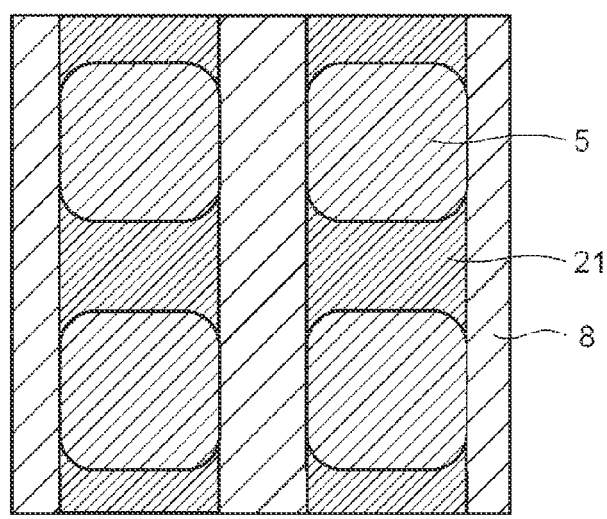
FIG. 12 is a drawing showing a fourth example of a planar form of a magnetic device of an embodiment.

The magnetic device 1 of an embodiment is such that a planar form of the side wall layer 8 can be the kind shown in FIG. 9. That is, the side wall layer 8 may cover an outer peripheral surface of the layered body 5 at a thickness such that at least some portion of the spike current can be caused to flow into the side wall layer 8. In this case, an interlayer insulating film 21 in which silicon nitride ($SiN_x$) or the like is disposed in a gap between the neighboring magnetic devices 1. When the resistance value of the side wall layer 8 in the absence of a spike can be set sufficiently high, the side wall layer 8 may itself fill the gap between neighboring magnetic devices 1, such as shown in FIG. 10. Furthermore, when manufacturing the magnetic device 1, a two-direction line processing may be such that the component of the side wall layer 8 is used in a line only rather than fully covering all side walls of the layered body 5. A material such as $SiN_x$, or the like can be used as the interlayer insulating film 21, as shown in FIGS. 11 and 12. For line processing referred to here, a stripe-form mask (line-space mask) is used. For example, a first etching can be carried out using the stripe-form mask, the etched portion is then filled with the material for the side wall layer 8, a second etching carried out in a perpendicular direction, and the newly etched portion is filled with the material of the interlayer insulating film 21. By using this kind of method, the layered body 5 having the planar form shown in FIG. 11 is obtained. In other examples, a first etching can be carried out using the stripe-form mask, the etched portion is then filled with the material of the interlayer insulating film 21, a second etching carried out in a perpendicular direction, and the newly etched portion filled with the material for the side wall layer 8. By using this kind of method, the layered body 5 having the planar form shown in FIG. 12 is obtained.

Figure 13A:
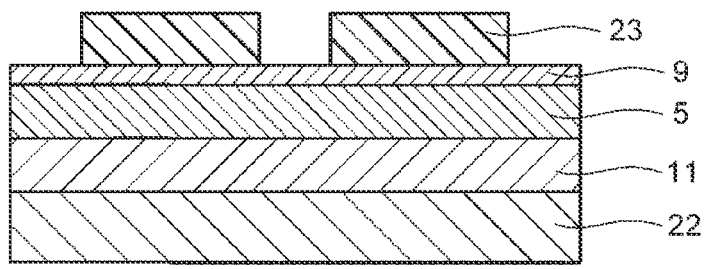
FIGS. 13A to 13E are cross-sectional views showing a first manufacturing process of a magnetic device of an embodiment.
Figure 13B:
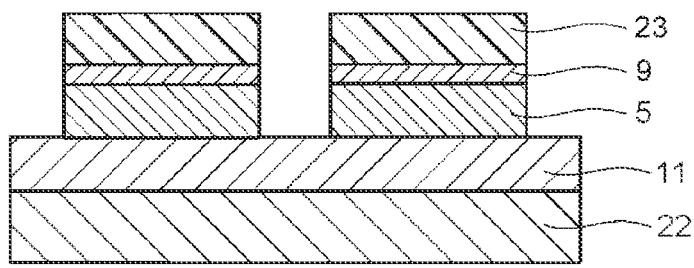
Figure 13C:
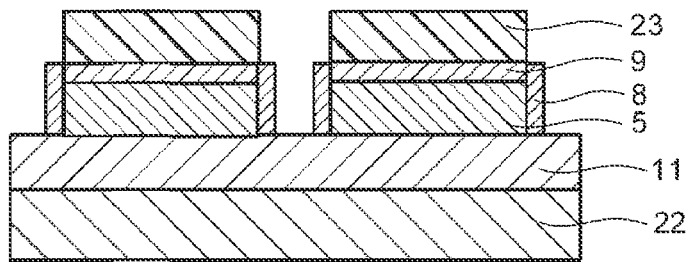
Figure 13D:
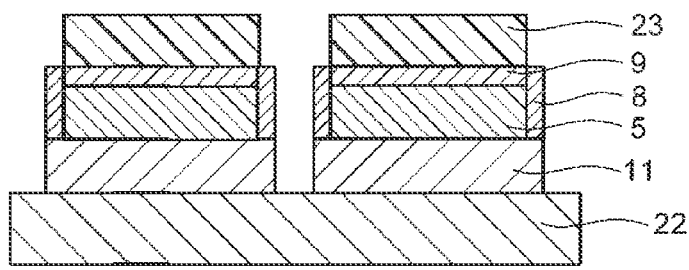
Figure 13E:
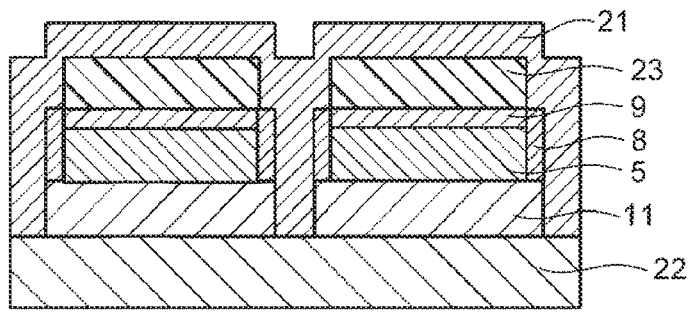

Next, a method of manufacturing the magnetic device 1 of an embodiment will be described. FIGS. 13A to 13E depict aspects of a first manufacturing process of the magnetic device 1, and is a process of manufacturing the magnetic device 1 having the planar form shown in FIG. 9. Firstly, as shown in FIG. 13A, the switching layer 11, the layered body 5, and the capping layer 9 are formed sequentially on a substrate 22, after which a mask 23 is formed on the capping layer 9. Next, as shown in FIG. 13B, the layered body 5 and the capping layer 9 are etched in accordance with the form of the mask 23 by applying an ion beam etching (IBE) or the like. Next, as shown in FIG. 13C, the side wall layer 8 is formed on side walls of the etched layered body 5 and capping layer 9. This formation is carried out by depositing the material for the side wall layer 8 and then carrying out an anisotropic etching. Next, as shown in FIG. 13D, the switching layer 11 is etched in accordance with the device form using a reactive ion etching (RIE) or the like. Subsequently, as shown in FIG. 13E, the interlayer insulating film 21 is deposited between neighboring devices.

Figure 14A:
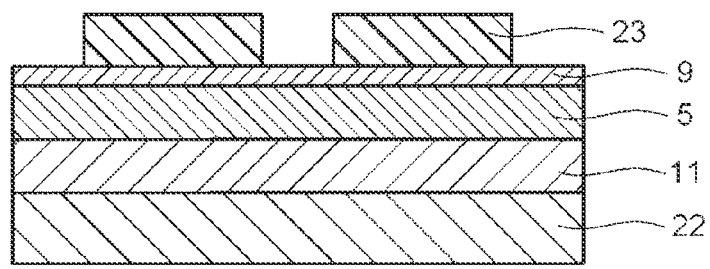
FIGS. 14A to 14C are cross-sectional views showing a second manufacturing process of a magnetic device of an embodiment.
Figure 14B:
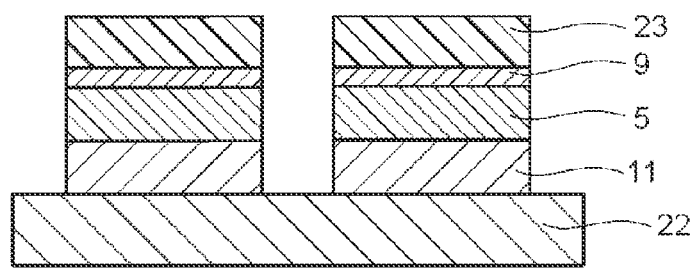
Figure 14C:
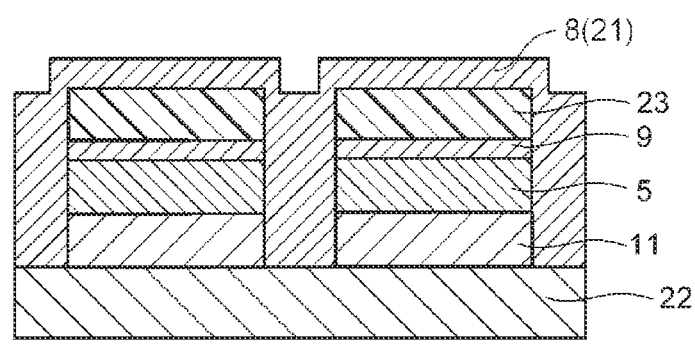

FIGS. 14A to 14C depict aspects of a second manufacturing process of a magnetic device 1, which is a process of manufacturing the magnetic device 1 having the planar form shown in FIG. 10. Firstly, as shown in FIG. 14A, the switching layer 11, the layered body 5, and the capping layer 9 are formed sequentially on the substrate 22, after which the mask 23 is formed on the capping layer 9. Next, as shown in FIG. 14B, the layered body 5 and the capping layer 9 are etched in accordance with the form of the mask 23 by applying an IBE or the like. Subsequently, as shown in FIG. 14C, the side wall layer 8 is deposited between neighboring devices. In some examples, a concentration gradient of the second substance may be provided in the side wall layer 8 in such a way that an atomic concentration of the second substance in a portion of the side wall layer 8 in a vicinity near a side wall of the layered body 5 is high, and the atomic concentration of the second substance in other portions of the side wall layer 8 is low.

Figure 15A:
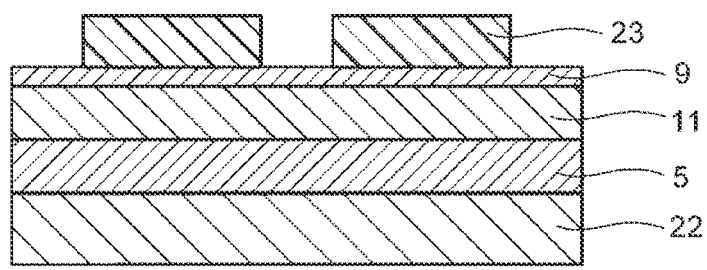
FIGS. 15A to 15E are cross-sectional views showing a third manufacturing process of a magnetic device of an embodiment.
Figure 15B:
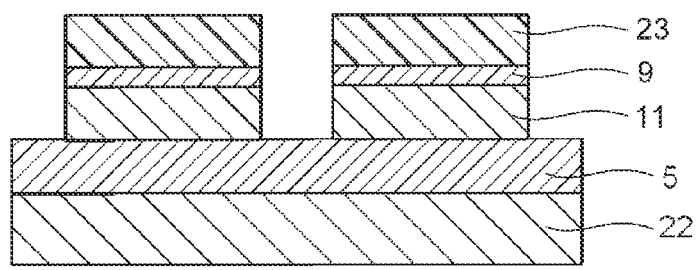
Figure 15C:
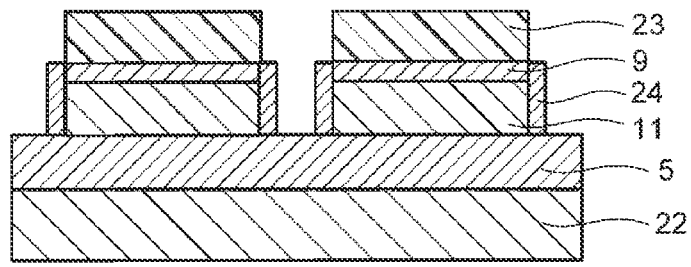
Figure 15D:
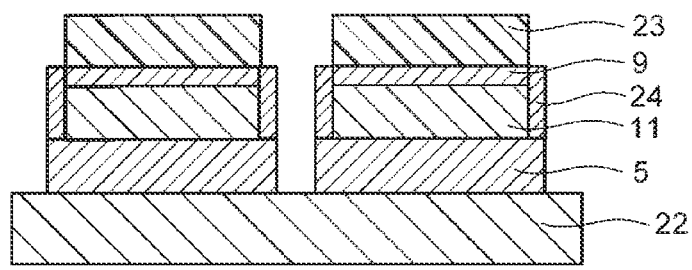
Figure 15E:
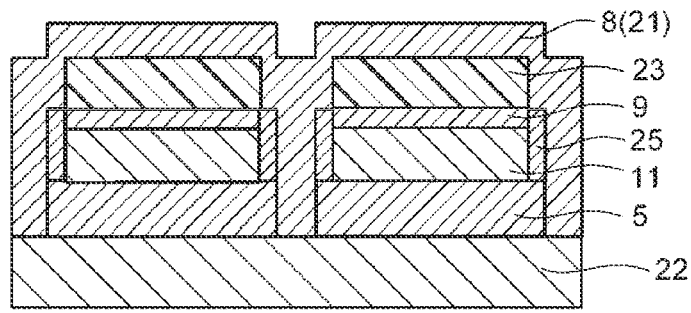

FIGS. 15A to 15E depict aspects of a third manufacturing process of a magnetic device 1. The manufacturing process shown in FIG. 15 is a process of manufacturing a magnetic device 1 having a device structure wherein the switching layer 11 is provided above the layered body 5. Firstly, as shown in FIG. 15A, the layered body 5, the switching layer 11, and the capping layer 9 are formed sequentially on the substrate 22, after which the mask 23 is formed on the capping layer 9. Next, as shown in FIG. 15B, the switching layer 11 and the capping layer 9 are etched in accordance with the form of the mask 23 using an RIE or the like. Then, as shown in FIG. 15C, a side wall layer 24 is deposited or otherwise formed on a side wall of the etched switching layer 11. The side wall layer 24 may be a composite material including a first substance and a second substance, or may be an insulator such as SiNx, in the same manner as the interlayer insulating film 21. Next, as shown in FIG. 15D, the layered body 5 is etched using an RIE or the like. Subsequently, as shown in FIG. 15E, a component (a composite material of a first substance and a second substance) of the side wall layer 8 is deposited between neighboring devices.

Figure 16A:
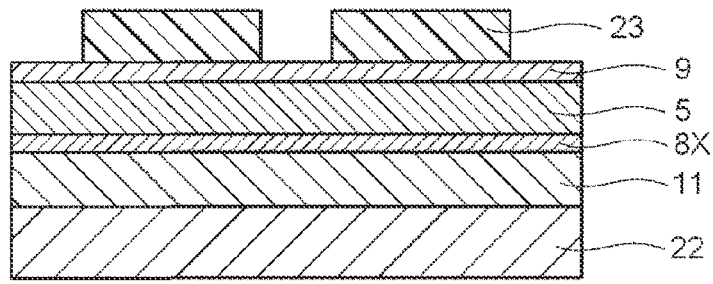
FIGS. 16A to 16D are cross-sectional views showing a fourth manufacturing process of a magnetic device of an embodiment.
Figure 16B:
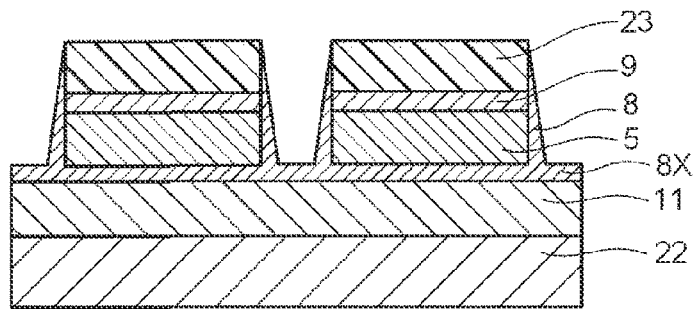
Figure 16C:
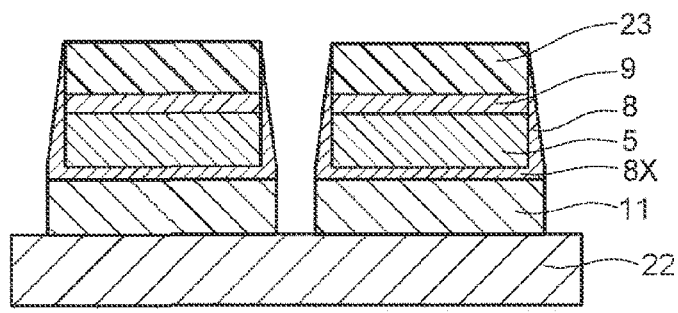
Figure 16D:
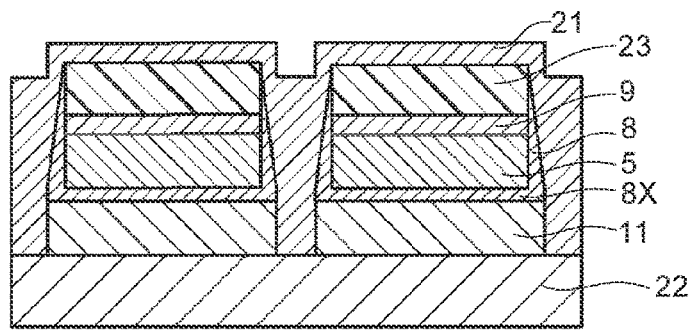

FIGS. 16A to 16D depict aspects of a fourth manufacturing process of a magnetic device 1. As shown in FIG. 16A, the switching layer 11, a composite material layer 8X of a semiconductor material or a metal material (e.g., at least one of Si, Zr, and Al) in a first substance forming a component of the side wall layer 8 and a second substance, the layered body 5, and the capping layer 9 are formed sequentially on the substrate 22, after which the mask 23 is formed on the capping layer 9. Next, as shown in FIG. 16B, the composite material layer 8X, the layered body 5, and the capping layer 9 are etched in accordance with the form of the mask 23 by applying an IBE or the like. At this time, components of the composite material layer 8X scatter owing to the IBE. However, such components may reattach to the side wall of the layered body 5. A composition of the composite material layer 8X caused to reattach may be adjusted using an ion implantation or the like. Next, an oxidation process or a nitriding process is implemented in accordance with a composition of the first substance, thereby forming the side wall layer 8 that is a composite material of the first substance and the second substance. Next, as shown in FIG. 16C, the switching layer 11 is etched in accordance with the device form using an RIE or the like. Subsequently, as shown in FIG. 16D, the interlayer insulating film 21 or the like is deposited between neighboring devices.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. Magnetic device, comprising:
    a layered body including a first magnetic layer, a second magnetic layer, and a first non-magnetic layer between the first magnetic layer and the second magnetic layer; and
    a side wall layer that covers a side wall of the first non-magnetic layer, wherein
    the side wall layer comprises at least one first substance selected from a group consisting of silicon oxide, zirconium oxide, aluminum oxide, aluminum nitride, and silicon nitride, and
    the side wall layer further comprises at least one second substance selected from a group consisting of arsenic, tellurium, antimony, bismuth, and germanium.

2. The magnetic device according to claim 1, wherein an atomic percentage of the second substance in the side wall layer is in a range of 2 to 46 atomic percent (atm %).

3. The magnetic device according to claim 1, wherein the second substance is tellurium.

4. The magnetic device according to claim 3, wherein the first substance is aluminum oxide.

5. The magnetic device according to claim 3, wherein the first substance is aluminum nitride.

6. The magnetic device according to claim 1, wherein the first substance is zirconium oxide.

7. The magnetic device according to claim 1, wherein
    the first substance is zirconium oxide, and
    the second substance is tellurium.

8. The magnetic device according to claim 1, wherein the first substance is silicon oxide.

9. The magnetic device according to claim 8, wherein the second substance is one of antimony, arsenic, and bismuth.

10. The magnetic device according to claim 1, wherein the side wall layer covers a side wall of the second magnetic layer.

11. The magnetic device according to claim 10, wherein the side wall layer covers a side wall of the first magnetic layer.

12. The magnetic device according to claim 1, wherein the side wall layer covers a side wall of the first magnetic layer.

13. The magnetic device according to claim 1, further comprising:
    a switching layer that is electrically connected to the layered body and includes at least one element selected from a group consisting of tellurium, selenium, sulfur, antimony, germanium, arsenic, and bismuth.

14. The magnetic device according to claim 1, further comprising:
    a capping layer on the layered body;
    a first wiring layer on the capping layer, the capping layer being between the first wiring layer and the layered body;
    a third magnetic layer on the layered body, the layered body being between the third magnetic layer and the capping layer;
    a buffer layer on the third magnetic layer, the third magnetic layer being between the layered body and the buffer layer; and
    a switching layer on the buffer layer, the buffer layer being between the switching layer and the third magnetic layer.

15. A magnetic storage device, comprising:
    a plurality of first electrode wires extending in a first direction;
    a plurality of second electrode wires extending in a second direction that intersects the first direction; and a plurality of magnetic devices, each between and electrically connected to one of the plurality of first electrode wires and one of the plurality of second electrode wires, wherein each magnetic device includes:
- a layered body including a first magnetic layer, a second magnetic layer, and a first non-magnetic layer between the first magnetic layer and the second magnetic layer; and
- a side wall layer that covers a side wall of the first non-magnetic layer, the side wall layer comprises at least one first substance selected from a group consisting of silicon oxide, zirconium oxide, aluminum oxide, aluminum nitride, and silicon nitride, and the side wall layer further comprises at least one second substance selected from a group consisting of arsenic, tellurium, antimony, bismuth, and germanium.

16. The magnetic storage device according to claim 15, wherein an atomic percentage of the second substance in the side wall layer is in a range of 2 to 46 atomic percent (atm %).

17. The magnetic storage device according to claim 15, wherein each magnetic device further includes:
a switching layer that is electrically connected to the layered body and includes at least one element selected from a group consisting of tellurium, selenium, sulfur, antimony, germanium, arsenic, and bismuth.

18. The magnetic storage device according to claim 15, wherein each magnetic device further includes:
- a capping layer on the layered body;
- a first wiring layer on the capping layer, the capping layer being between the first wiring layer and the layered body;
- a third magnetic layer on the layered body, the layered body being between the third magnetic layer and the capping layer;
- a buffer layer on the third magnetic layer, the third magnetic layer being between the layered body and the buffer layer; and
- a switching layer on the buffer layer, the buffer layer being between the switching layer and the third magnetic layer.

19. The magnetic storage device according to claim 15, wherein the side wall layer covers an entire side wall of the layered body.

20. The magnetic storage device according to claim 19, wherein
the first substance is zirconium oxide, and
the second substance is tellurium.

* * * * *